(12) United States Patent
Sakurada (10) Patent No.: US 7,518,702 B2
(45) Date of Patent: Apr. 14, 2009

(54) ELECTROOPTICAL MANUFACTURING APPARATUS, ELECTROOPTICAL APPARATUS, AND ELECTRONIC DEVICE

(75) Inventor: Kazuaki Sakurada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/778,317

(22) Filed: Feb. 17, 2004

(65) Prior Publication Data
US 2004/0207797 A1  Oct. 21, 2004

(30) Foreign Application Priority Data
Mar. 11, 2003  (JP) .............................. 2003-065319

(51) Int. Cl.
*G02F 1/1339*  (2006.01)
(52) U.S. Cl. ................... 349/190; 349/153; 349/156
(58) Field of Classification Search ................. 349/153, 349/156, 190
See application file for complete search history.

(56) References Cited

U.S. PATENT DOCUMENTS

| | | | |
|---|---|---|---|
| 6,055,035 A * | 4/2000 | von Gutfeld et al. ........ | 349/187 |
| 6,219,128 B1 | 4/2001 | Von Gutfeld | |
| 6,473,148 B1 * | 10/2002 | Suh ............................ | 349/153 |
| 6,573,972 B2 | 6/2003 | Sasaki | |
| 6,791,654 B2 * | 9/2004 | Lee ............................ | 349/153 |
| 2001/0046008 A1 * | 11/2001 | Ueda et al. .................... | 349/74 |
| 2002/0008838 A1 * | 1/2002 | Matsuda ....................... | 349/187 |
| 2002/0131009 A1 * | 9/2002 | Takeuchi .................... | 349/153 |
| 2003/0223030 A1 * | 12/2003 | Byun et al. .................. | 349/187 |

FOREIGN PATENT DOCUMENTS

| | | |
|---|---|---|
| CN | 1256431 A | 6/2000 |
| GB | 2183073 A | 5/1987 |
| JP | H04-060518 A | 2/1992 |
| JP | 05-281562 A | 10/1993 |
| JP | H05-346561 A | 12/1993 |
| JP | H6-175140 A | 6/1994 |
| JP | H07-159795 A | 6/1995 |
| JP | 08-106101 A | 4/1996 |
| JP | H09-061831 A | 3/1997 |
| JP | 10-221666 A | 8/1998 |
| JP | H11-038424 A | 2/1999 |
| JP | 2001-174829 A | 6/2001 |
| JP | 2001-183674 A | 7/2001 |

(Continued)

*Primary Examiner*—David Nelms
*Assistant Examiner*—Phu Vu
(74) *Attorney, Agent, or Firm*—Global IP Counselors, LLP (57) ABSTRACT

An electrooptical manufacturing apparatus is provided for manufacturing an electrooptical apparatus with an improved liquid crystal display quality. The apparatus basically includes a dam-forming section or apparatus, a droplet-ejecting section or apparatus, a seal-forming section or apparatus and a pressure applying section or apparatus. The dam-forming section is configured and arranged to form a dam that defines a liquid crystal area on the internal surface of a first substrate. The droplet-ejecting section is configured and arranged to eject and drop a specific amount of liquid crystal inside the dam. The seal-forming section is configured and arranged to form a seal that is disposed on the external periphery of the dam for sealing a second substrate disposed opposite the first substrate. The pressure applying section is configured and arranged to superpose and press in a vacuum atmosphere the second substrate onto the seal formed on the first substrate.

8 Claims, 8 Drawing Sheets

FOREIGN PATENT DOCUMENTS

| | | |
|---|---|---|
| JP | 2001-264775 A | 9/2001 |
| JP | 2001-343657 A | 12/2001 |
| JP | 2002-202512 A | 7/2002 |
| JP | 2002-296604 A | 10/2002 |
| JP | 2002-341362 A | 11/2002 |
| KR | P1998-036758 A | 8/1998 |

\* cited by examiner

Fig. 9

ELECTROOPTICAL MANUFACTURING APPARATUS, ELECTROOPTICAL APPARATUS, AND ELECTRONIC DEVICE

BACKGROUND OF THE INVENTION

1. Field of the Invention

The present invention generally relates to an electrooptical apparatus for manufacturing an electrooptical apparatus. More specifically, the present invention relates to an electrooptical apparatus designed to achieve improved liquid crystal display quality in an electrooptical apparatus.

2. Background Information

A liquid crystal apparatus is commonly formed by a process in which a lighting apparatus such as a backlight, and an auxiliary device such as an integrated circuit (IC) for driving liquid crystals are mounted on a liquid crystal display panel that is obtained by sealing a liquid crystal between two substrates.

A liquid crystal display panel is commonly formed by a method in which a first substrate provided with a first electrode, and a second substrate provided with a second electrode are laminated together by a seal that forms a gap formed between the first and second substrates. The gap formed between the first and second substrates is often called a cell gap. A liquid crystal is then injected through an injection port into the gap formed between the first and second substrates. A plug is used for closing the injection port after the liquid crystal has been injected. Thus, the liquid crystal is sealed in the cell gap by a commonly known injection method.

As used herein, the term "liquid crystal injection method" refers to a method in which a liquid crystal is injected by a pressure difference through a liquid crystal injection port under a vacuum, and the method for introducing the liquid crystal is as follows. First, a yet-unsealed liquid crystal display element (referred to hereinbelow as "a liquid crystal display cell") is thoroughly degassed in a vacuum, and the injection port is sealed with a liquid crystal. The liquid crystal display cell thus obtained is returned to the atmosphere, and is then filled using surface tension and the pressure difference between the inside and outside of the liquid crystal display cell. For this reason, the process becomes extremely time-consuming as the liquid crystal display element increases in size. A resulting drawback is that the process lasts a day or longer for a large substrate measuring one meter or greater on a side, which is impractical from the manufacturing standpoint.

In view of this, it has been proposed in the past to forgo the injection of liquid crystals and to use an inkjet process. In this inkjet process, a droplet-ejecting head is used to eject a liquid crystal into the frame of a first substrate obtained by forming a frame-like seal, and then laminating a mating second substrate onto the first substrate, as disclosed in Japanese Laid Open Patent Publication Nos. 05-281562, 10-221666 and 2001-183674.

The conventional inkjet processes described in these Patent Publications are disadvantageous, however, in that the liquid crystal is often contaminated with impurities and the liquid crystal display quality is compromised because of the contact between the liquid crystal and the uncured seal.

In view of the above, it will be apparent to those skilled in the art from this disclosure that there exists a need for an improved electrooptical manufacturing apparatus for manufacturing an electrooptical apparatus. This invention addresses this need in the art as well as other needs, which will become apparent to those skilled in the art from this disclosure.

SUMMARY OF THE INVENTION

In view of the above-described drawbacks, it is an object of the present invention to provide an electrooptical manufacturing apparatus for manufacturing an electrooptical apparatus, and also to provide an electrooptical apparatus and an electronic device that are manufactured by the electrooptical manufacturing apparatus of the present invention.

The foregoing object is basically attained by providing an electrooptical manufacturing apparatus for manufacturing an electrooptical apparatus that comprises a dam-forming section, a seal-forming section, a droplet-ejecting section and a droplet-ejecting section. The dam-forming section is configured and arranged to form a dam that defines a liquid crystal area on an internal surface of a first substrate. The seal-forming section is configured and arranged to form a seal disposed around an external periphery of the dam to seal a second substrate disposed opposite the first substrate. The droplet-ejecting section is configured and arranged to drop a specific amount of liquid crystal inside the dam. The pressure applying section is configured and arranged to press the second substrate onto the seal formed on the first substrate.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
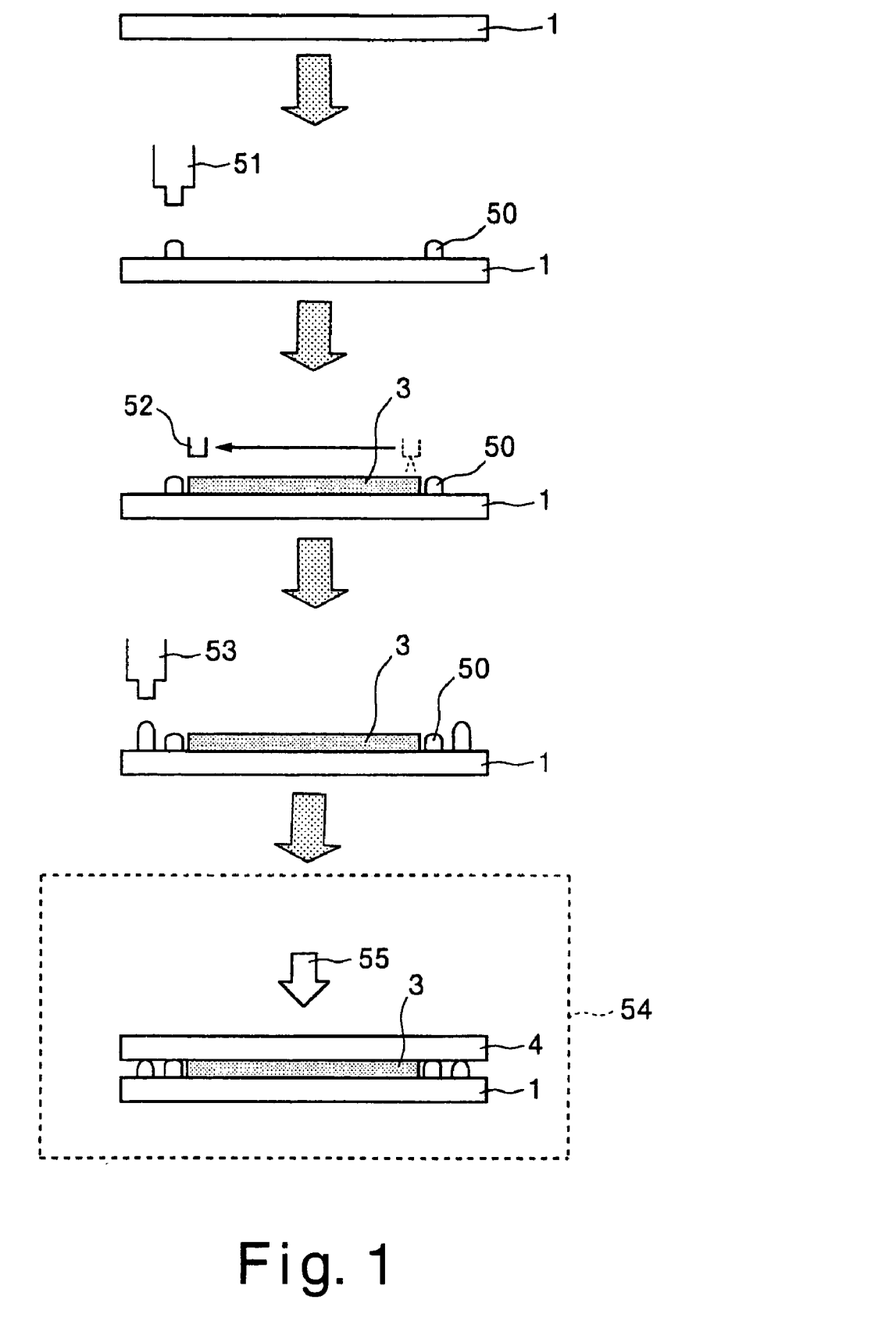
FIG. 1 is a schematic diagram illustrating the steps for manufacturing an electrooptical apparatus (a liquid crystal panel) in accordance with the first embodiment of the present invention wherein of the electrooptical manufacturing apparatus for manufacturing an electrooptical apparatus is diagrammatically illustrated.
Figure 2:
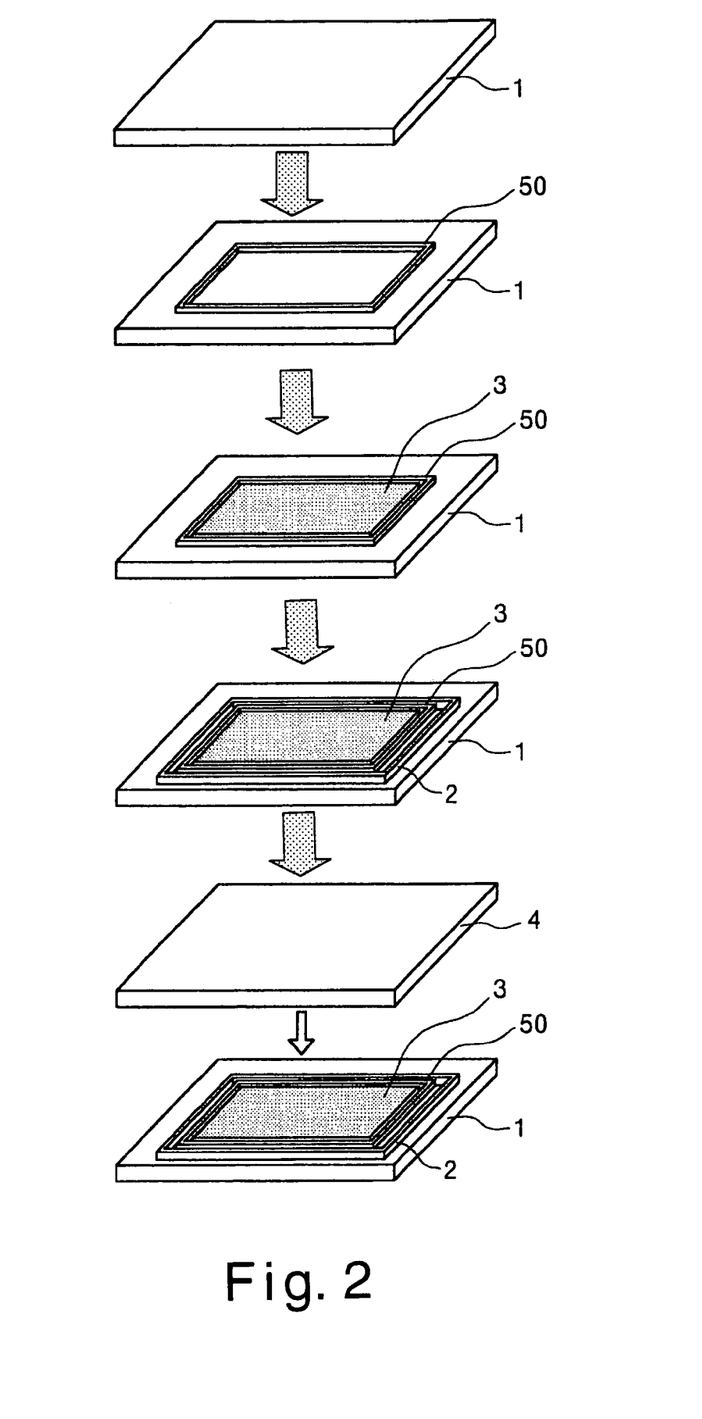
FIG. 2 is a schematic diagram illustrating the electrooptical apparatus (the liquid crystal panel) being formed by the manufacturing steps illustrated in FIG. 1 in accordance with the first embodiment of the present invention.
Figure 3:
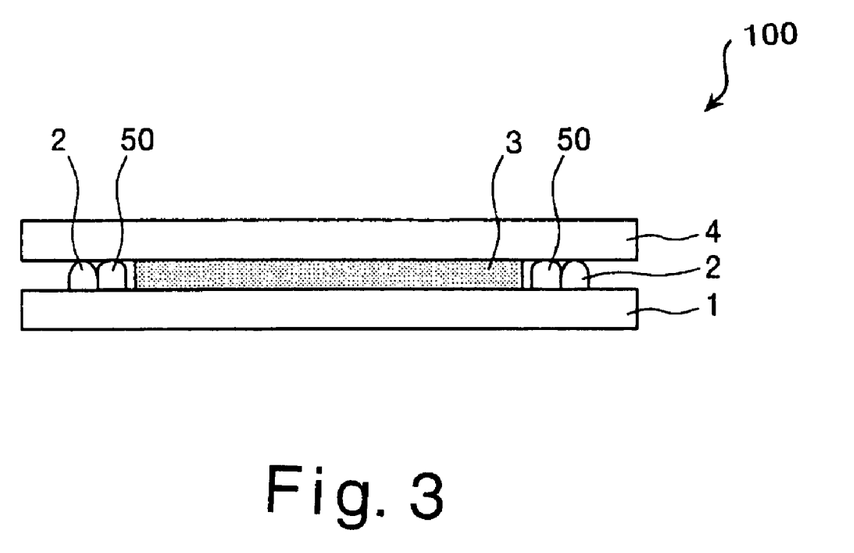
FIG. 3 is a diagrammatic edge elevational view of the electrooptical apparatus that was manufactured by the steps illustrated in FIGS. 1 and 2 in accordance with the first embodiment of the present invention.
Figure 4:
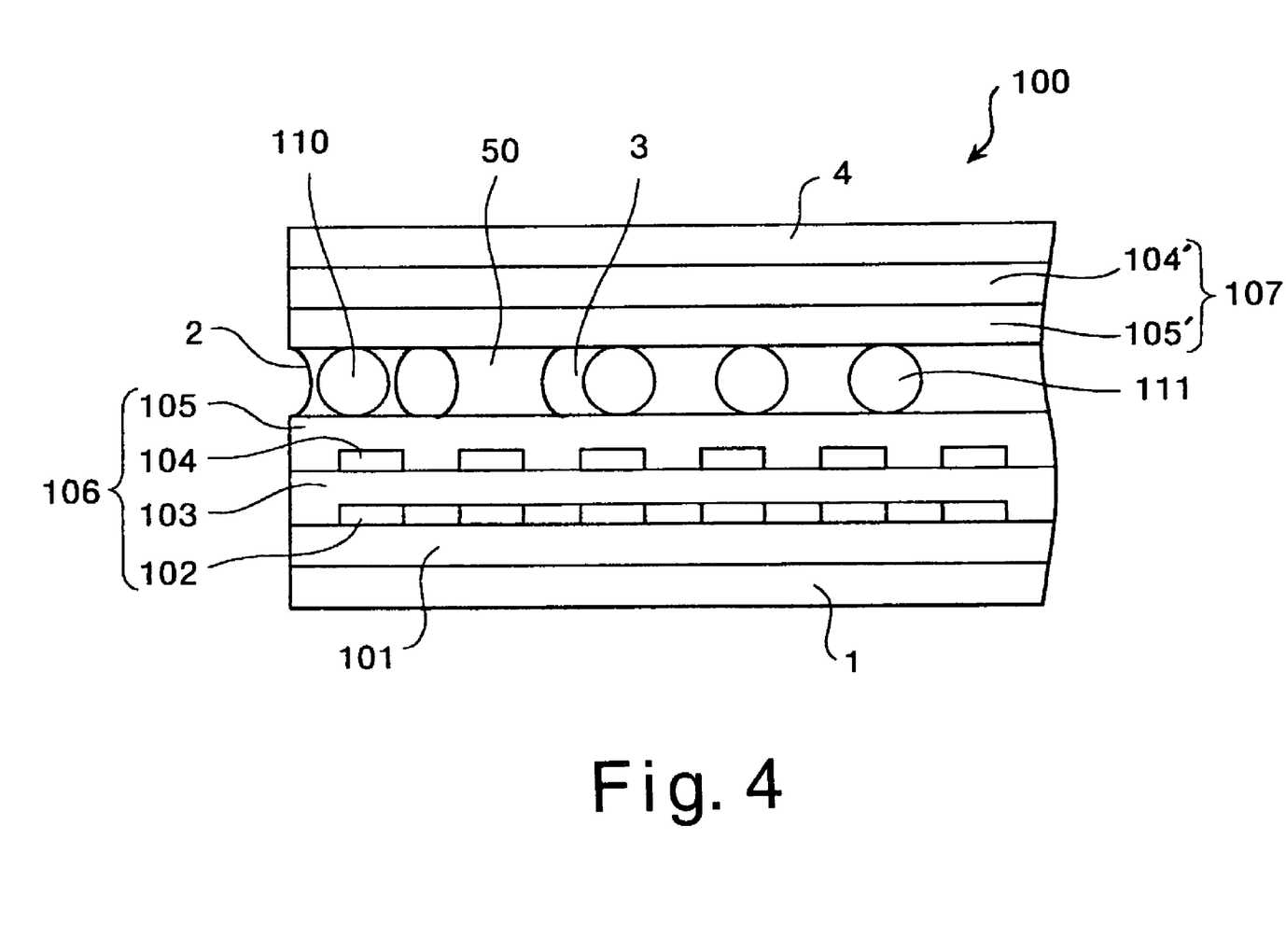
FIG. 4 is an enlarged partial diagrammatic edge elevational view of a portion of the electrooptical apparatus (the liquid crystal panel) illustrated in FIG. 3 in accordance with the first embodiment of the present invention.

Referring initially to FIGS. 1-4, a schematic diagram of an electrooptical manufacturing process is illustrated for manufacturing an electrooptical apparatus (a liquid crystal panel) 100 in accordance with a first embodiment of the present invention, wherein the electrooptical manufacturing apparatus for manufacturing an electrooptical apparatus is diagrammatically illustrated. FIG. 1 is a schematic diagram illustrating the steps for manufacturing the electrooptical apparatus or liquid crystal panel 100 in accordance with the first embodiment of the present invention wherein the electrooptical manufacturing apparatus for manufacturing an electrooptical apparatus is diagrammatically illustrated. FIG. 2 is a schematic diagram of the manufacturing steps for producing the electrooptical apparatus or liquid crystal display panel 100. FIG. 3 is a schematic diagram of the completed electrooptical apparatus or liquid crystal display panel 100. FIG. 4 is an enlarged partial diagrammatic edge elevational view of a portion of the electrooptical apparatus or liquid crystal panel 100 illustrated in FIG. 3.

As seen in FIG. 1, the electrooptical apparatus or liquid crystal display panel 100 is formed by a method in which a first substrate 1 provided with a first electrode, and a second substrate 4 provided with a second electrode are laminated together by an annular seal 2. A liquid crystal 3 is sealed in the cell gap formed between the substrates 1 and 4. An annular dam 50 is disposed adjacent the seal 2 such that the dam 50 defines a liquid crystal area on the internal surface of the first substrate 1. Preferably, the seal 2 and the dam 50 are bonded together during the manufacturing process of the liquid crystal display panel 100. High seal strength can be maintained simply by using a thermosetting or photo-setting adhesive as the sealant for the seal 2 that is heated or light irradiated.

The dam 50 separates the seal 2 from the liquid crystal 3 located in the liquid crystal area to prevent the liquid crystal 3 from being contaminated by the impurities or the like from the seal 2. Thus, the dam 50 prevents liquid crystal display quality from being lowered. It is also possible to adopt an arrangement in which the seal 2 is made higher than the dam 50 to improve the bonding properties as explained below.

The liquid crystal display panel 100 can be made more compact, and the liquid crystal display area can be reduced, by disposing the dam 50 and the seal 2 adjacent to each other. It is also possible to adopt an arrangement in which the dam 30 and the seal 2 are made from the same material. It is further possible to adopt an arrangement in which the formed dam 50 is rendered liquid-repellent and conferred with low wettability.

The substrate interval can be kept constant and the display quality of a liquid crystal panel can be prevented from being lowered due to the non-uniformities of the gap between the substrates by using an adhesive that contains spacing particles as the sealant.

The structure of a liquid crystal display panel, which is the electrooptical apparatus or liquid crystal display panel 100 pertaining to the present invention, will now be described with reference to FIG. 4. The liquid crystal display panel 100 in accordance with the present embodiment has the first substrate 1 and the second substrate 4 disposed opposite each other, with liquid crystal display elements 106 and 107 being formed on the internal surfaces of the first substrate 1 and the second substrate 4, respectively. Specifically, a reflective film (aluminum, silver, or the like) 101, a color filter (CF) 102, an overcoat layer (OVC) 103, a transparent electrode 104, and an oriented film 105 are sequentially formed on the first substrate 1 to obtain the liquid crystal display element 106 on the internal side of the first substrate 1, as shown in FIG. 4. A transparent electrode 104' and an oriented film 105' are also formed on the internal surface of the second substrate 4. The transparent electrodes 104 and 104' are formed from ITO (indium tin oxide) or another transparent electrode material. The transparent electrode 104' is provided with a specific pattern to obtain a liquid crystal display element 106 on the internal side of the second substrate 4. The oriented films 105 and 105' are formed, for example, from polyimide (PI) or another film material, and are subjected to an orientation treatment (rubbing treatment).

The seal 2 is preferably configured and arranged in a substantially rectangular configuration on the internal peripheries of the first substrate 1 and the second substrate 4 that have been provided with liquid crystal display elements in the above-described manner. The annular dam 50 is disposed adjacent the seal 2 such that the dam 50 defines a liquid crystal area on the internal surface of the first substrate 1. Preferably, the seal 2 and the dam 50 are bonded together during the manufacturing process of the liquid crystal display panel 100. The seal 2 preferably contains spacing particles 110 that are dispersed throughout the seal 2. The spacing particles 110 serve as spacers to maintain a specific gap between the first and second substrates 1 and 4 so as to create a so called cell gap.

The liquid crystal also preferably contains spacing particles 111, which serve as spacers. Thus, the spacing particles 111 also serve to maintain a specific gap between the first and second substrates 1 and 4 so as to create the so called cell gap. Thus, the spacing of the substrates 1 and 4 can be kept constant and the display quality of a liquid crystal panel can be prevented from being lowered due to the non-uniformities of the gap between the substrates 1 and 4 by dispersing the spacing particles 111 on the substrate 1 after the placement of the seal 2. The use of a separate step for dispersing the spacing particles 111 can be eliminated by dispersing the spacing particles 111 together with the liquid crystal 3.

The electrooptical manufacturing apparatus for manufacturing an electrooptical apparatus 100 in accordance with the present embodiment will now be described with reference to FIGS. 1 and 2. The electrooptical manufacturing apparatus for manufacturing the electrooptical apparatus 100 in accordance with the present embodiment basically includes a dam-forming section or apparatus 51, a droplet-ejecting section or apparatus 52, a seal-forming section or apparatus 53 and a pressure applying section or apparatus 55. The dam-forming apparatus 51 is configured and arranged to form the dam 50 that defines a liquid crystal area on the internal surface of the first substrate 1. The droplet-ejecting apparatus 52 is configured and arranged to eject and drop a specific amount of liquid crystal 3 inside the dam 50. The seal-forming apparatus 53 is configured and arranged to form the seal 2 that is disposed around the external periphery of the dam 50. The seal 2 extends higher than the dam 50 from the first substrate 1.

Thus, the seal 2 is designed to form a seal for sealing the first and second substrates 1 and 4 together. The pressure apparatus 55 is configured and arranged to superpose and press the second substrate 4 onto the seal 2 that is formed on the first substrate 1. Preferably, the pressing of the second substrate 4 onto the seal 2 on the first substrate 1 is performed in a vacuum atmosphere 54, as shown in FIGS. 1 and 2.

The dam 50 is preferably formed of a material that has high liquid repellency with respect to the liquid crystal. For example, the dam 50 is preferably treated with a fluorine-based gas plasma or subjected to another liquid repellency treatment that confers a low wettability property to the dam 50 relative to the liquid crystal 3. It is also possible to use a fluororesin on the dam 50. Examples of surface treatments based on the use of such fluorine-based gas plasma treatments include a reduced-pressure plasma treatment or atmospheric-pressure plasma treatment in which a gas that contains fluorine or a fluorine compound is used as the gas being introduced. The dam 50 is irradiated with plasma in an atmospheric-pressure or reduced-pressure environment containing a fluorine compound or oxygen. Examples of gases that contain fluorine or fluorine compounds include $CF_4$, $SF_6$, and $CHF_3$.

The dam 50 is preferably formed, for example, by one of a dispenser method, a screen printing method, an inkjet printing method, or the like. After being formed, the dam 50 is preferably hardened by heating or the like. Forming the dam 50 in this manner prevents any contact between the liquid crystal 3 and the uncured seal 2, when the liquid crystal 3 is applied. Thus, the dam 50 eliminates the adverse effects such as those caused by contamination with the impurities from the seal 2, and therefore making it possible to improve the liquid crystal display quality.

Figure 5:
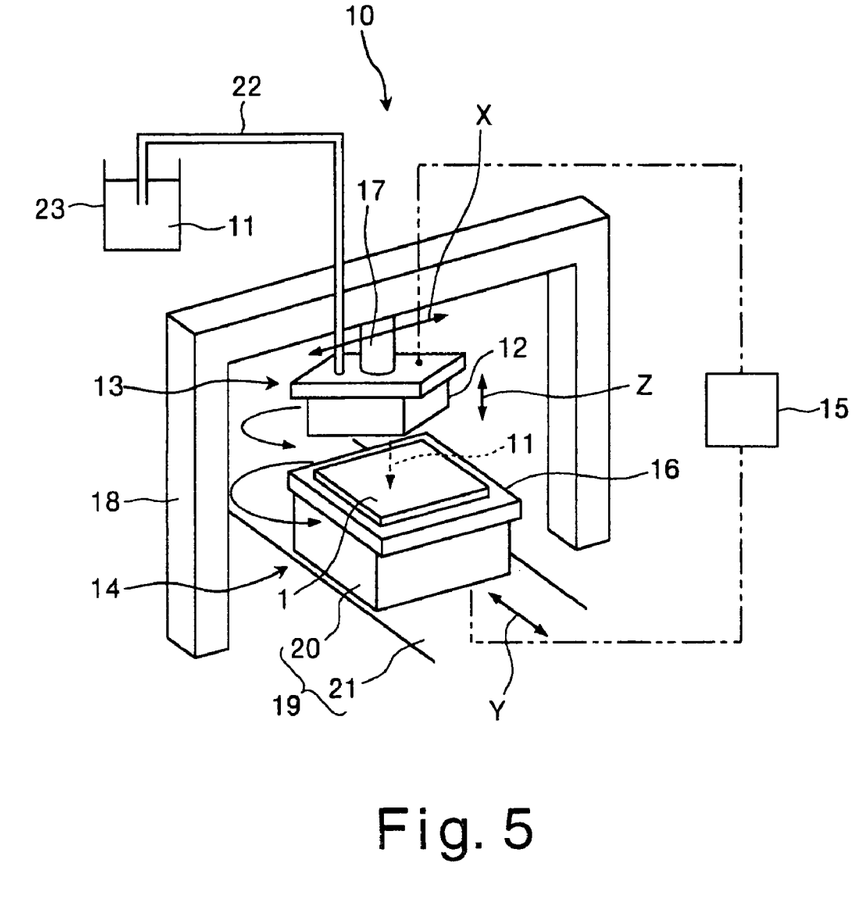
FIG. 5 is a diagrammatic perspective view of a thin film forming apparatus used to perform the manufacturing steps illustrated in FIG. 1 in accordance with the first embodiment of the present invention.
Figure 6:
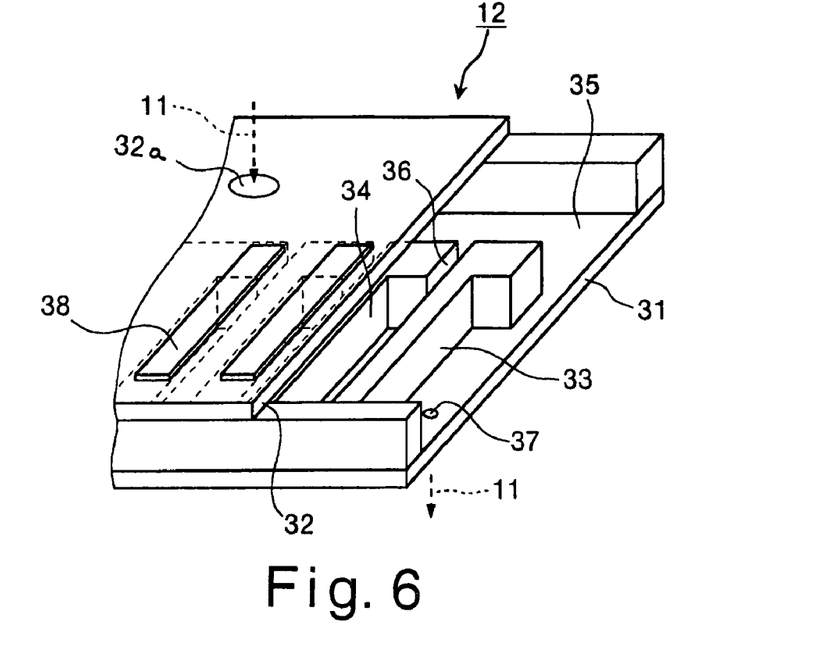
FIG. 6 is an enlarged partial diagrammatic perspective view of the droplet-ejecting head used in the thin film forming apparatus illustrated in FIG. 5 in accordance with the first embodiment of the present invention.
Figure 7:
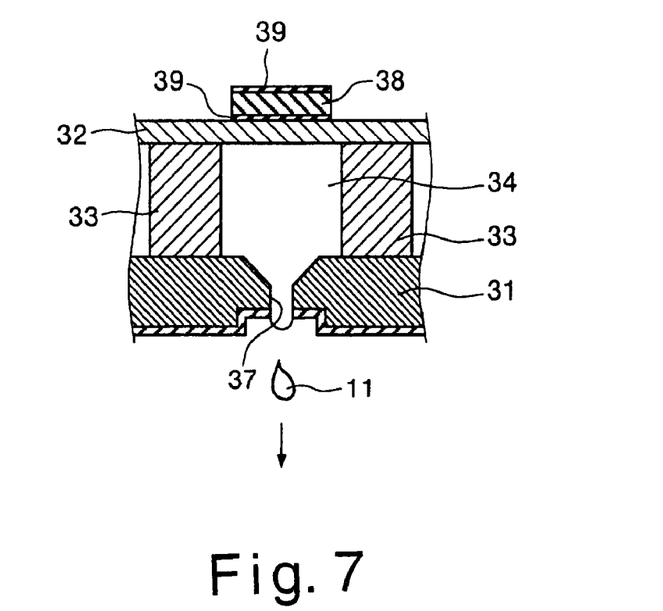
FIG. 7 is an enlarged partial diagrammatic cross sectional view of the droplet-ejecting head illustrated in FIG. 6 in accordance with the first embodiment of the present invention.

Next, an example of a thin film forming apparatus 10 for applying a liquid crystal in accordance with the present embodiment is shown in FIGS. 5 to 7. The apparatus 10 is used for forming a thin film (liquid crystal) on a substrate of a liquid crystal display apparatus, as shown in FIG. 5. In this embodiment, the liquid crystal 3 is ejected into an internal area defined by the dam 50 and the seal 2 that have been formed in a frame configuration on the internal surface side of the first substrate 1 having the liquid crystal display element 106. The second substrate 4 having the oppositely formed liquid crystal display element 107 is then laminated, and a liquid crystal display panel 100 such as the one shown in FIG. 4 is formed.

Any commercially available adhesive can be substituted herein as the sealant for forming the seal 2. However, it is preferably that any sealant material contains dispersed spacing particles 110 for maintaining the thickness between the substrates 1 and 4 and maintaining the desired weight of the liquid crystal. Of course, as mentioned above, the gap between the substrates 1 and 4 can also be kept uniform by dispersing the spacing particles 111 on the substrates 1 and 4 after the seal 2 has been formed. The spacing particles 111 can be dispersed before, simultaneously or after the liquid crystal 3 has been applied.

Of course, the additional step for dispersing the spacing particles 111 can be eliminated by adopting an approach in which the liquid crystal 3 contains the spacing particles 111 such that the coating solution 11 contains the liquid crystal 3 and the spacing particles 111. Thus, the liquid crystal 3 and the spacing particles 111 are simultaneously sprayed from the droplet-ejecting apparatus 10 in a single step.

A thermosetting adhesive or photo-setting adhesive can be used as the sealant, and plastic particles such as silica particles or polystyrene particles, particles obtained by coating silica particles with thermoplastic particles, or the like can be used as the spacing particles. A specific amount of liquid crystal is applied in a flat configuration from a droplet-ejecting nozzle into an area enclosed within the frame-like seal 2 formed on the substrate 1.

A liquid crystal display element can be obtained by curing the adhesive after second substrate 4 has been laminated to the first substrate 1. The lamination should preferably be performed in a vacuum.

The thin film forming apparatus 10 in accordance with the present embodiment basically comprises a droplet-ejecting apparatus 13 having a droplet-ejecting head 12 for ejecting, for example, liquid crystal or another coating solution 11 onto the internal surface of the first substrate 1 that is provided with a liquid crystal display element. The thin film forming apparatus 10 also comprises a movement apparatus 14 and a control unit 15. The movement apparatus 14 is configured and arranged to allow the positions of the droplet-ejecting head 12 and the substrate 1 to be moved relative to each other. The control unit 15 is configured and arranged to control the droplet-ejecting apparatus 13 and movement apparatus 14, as shown in FIG. 5.

The movement apparatus 14 basically comprises a rotatable substrate platform 16, a rotatable head support 17, a movable platform 18 and a platform drive 19. The head support 17 supports the droplet-ejecting head 12 such that the droplet-ejecting head 12 faces down towards the substrate 1 that is mounted the substrate platform 16. The head support 17 is configured and arranged on the movable platform 18 for movement in the direction of the X-axis by the movable platform 18, as shown in FIG. 5. The head support 17 is further configured and arranged on the movable platform 18 for up and down movement in the direction of the Z-axis and for rotational movement in the direction about a vertical axis, as shown in FIG. 5.

The head support 17 preferably comprises a linear motor or other mechanism configured and arranged to move and position the droplet-ejecting head 12 with an arbitrary movement speed relative to the substrate 1 in the direction of the Z-axis, which is perpendicular to the substrate 1. The head support 17 also preferably comprises a stepping motor or other mechanism configured and arranged to set the droplet-ejecting head 12 to an arbitrary angle relative to the underlying substrate 1 by rotating the head about the vertical axis.

The platform drive 19 is configured and arranged to move the substrate 1 together with the substrate platform 16 in the direction of the Y-axis relative to the overlying droplet-ejecting head 12, as shown in FIG. 5. The platform drive 19 preferably comprises a θ-platform 20 and a linear platform 21. The θ-platform 20 preferably includes a stepping motor or the like, while the linear platform 21 preferably includes a linear motor or the like. The θ-platform 20 is configured and arranged to rotate the substrate platform 16 about the vertical axis and to set the substrate platform 16 to an arbitrary angle relative to the overlying droplet-ejecting head 12. The linear platform 21 is configured and arranged to move and position the substrate platform 16 in the horizontal direction (Y-direction) relative to the droplet-ejecting head 12.

The droplet-ejecting apparatus 13 comprises the droplet-ejecting head 12 and a tank 23 connected thereto by a tube 22. The tank 23 is a device for storing the coating solution 11 and feeding this coating solution 11 to the droplet-ejecting head 12 via the tube 22. Thus, the droplet-ejecting apparatus 13 is adapted to eject the coating solution 11 stored in the tank 23 from the droplet-ejecting head 12, and to apply the solution to the substrate 1. The droplet-ejecting head 12 can operate on a principle whereby, for example, a liquid chamber is compressed by a piezoelement, and droplets (liquid material) are ejected by the resulting pressure. The head 12 has a plurality of nozzles (nozzle holes) arranged in a single row or a plurality of rows.

An example of the structure of the droplet-ejecting head 12 is described with reference to FIGS. 6 and 7. As shown in FIGS. 6 and 7, the droplet-ejecting head 12 comprises, for example, a stainless steel nozzle plate 31 and a vibrating plate 32, and a reservoir plate formed by a plurality of partitioning members 33. The plates 31 and 32 are joined via the partitioning members 33. The partitioning members are configured and arranged to form a plurality of spaces 34 and a liquid reservoir 35 between the nozzle plate 31 and the vibrating plate 32. The spaces 34 and the liquid reservoir 35 are filled with a liquid material or coating solution 11 (not shown in FIGS. 6 and 7). The spaces 34 and the liquid reservoir 35 are fluidly connected together by a plurality of feed ports 36. In addition, fine nozzles or holes 37 for spraying the liquid material or coating solution 11 from the spaces 34 are formed in the nozzle plate 31. Also, a hole 32a is formed in the vibrating plate 32 for feeding the coating solution 11 to the liquid reservoir 35.

Piezoelectric elements 38 are bonded to the upper surface of the vibrating plate 32 that is opposite the surface facing the spaces 34, as shown in FIGS. 6 and 7. Each piezoelectric element 38 is positioned between two electrodes 39, as shown in FIG. 7. The piezoelectric elements 38 bend so that they protrude outward when energized. The vibrating plate 32 to which the piezoelectric elements 38 are bonded in this structure are integral with the piezoelectric elements 38 and are bent outward at the same time as the elements, resulting in a configuration in which the internal volume of the spaces 34 increases as a result of this action. Consequently, the liquid material enters the spaces 34 from the liquid reservoir 35 via the feed ports 36 in an amount corresponding to the increase in the internal volume of the spaces. In addition, the piezoelectric elements 38 and the vibrating plate 32 both return to their initial shape when the piezoelectric elements 38 are de-energized from such a state. Consequently, the pressure of the coating solution 11 in the spaces increases, and fog-like droplets of the liquid material are ejected from the nozzle 37 toward the substrate 1 because the spaces 34 return to their original volume.

A system other than a piezo-jet type which uses piezoelectric elements can also be used for the droplet-ejecting head 12, and the liquid crystal, or the coating solution 11, can be sprayed through the fine nozzles by using an ultrasonic motor, linear motor, or the like, or by inducing vibrations and applying pressure within the tank. The liquid crystal in the tank should be subjected to a foaming treatment in advance. The droplet-ejecting apparatus 13 can also be configured as a so-called bubble-jet® system in which the liquid crystal 3 is sprayed through fine nozzles by heating the liquid crystal or a mixture of the liquid crystal and a low-viscosity volatile liquid in the tank, and expanding or foaming this substance.

The control unit 15 comprises a microprocessor or other CPU with a control program for controlling the entire apparatus 10, and a computer or other device having the function of inputting and outputting various signals. At least one of the operations involving the ejecting action of the droplet-ejecting apparatus 13 and the moving action of the movement apparatus 14 can be controlled by electrically connecting the droplet-ejecting apparatus 13 and movement apparatus 14, as shown in FIG. 5, with both operations being controlled in the present embodiment.

Adopting such an arrangement allows the conditions for ejecting liquid droplets to be adjusted, and the coating amount of the resulting thin film (liquid crystal) to be controlled.

Specifically, the control unit 15 has the following functions for controlling the coating amount: (1) a control function or section for adjusting the interval at which liquid droplets are ejected onto the substrate; (2) a control function or section for adjusting the amount in which the liquid droplets are ejected per dot; (3) a control function or section for setting the angle ($\theta$) between the direction in which the nozzles are arranged and the direction in which the system is moved by the movement mechanism; and (4) a control function or section for dividing the substrate into a plurality of areas and setting the ejection conditions for each area.

Furthermore, the control unit 15 has the following functions for adjusting the ejection interval: (1) a control function or section for adjusting the relative movement speed and ejection interval between the substrate 1 and the droplet-ejecting head 12; (2) a control function or section for adjusting the ejection time interval and ejection interval of the movement means; and (3) a control function or section for arbitrarily selecting, from a plurality of nozzles, the nozzles for simultaneously ejecting the coating solution, and adjusting the ejection interval.

It is also possible to provide heating unit for heating the tank 23, tube 22, and droplet-ejecting head 12 as needed in order to raise the temperature and maintain the desired fluidity of the liquid crystal as the coating solution 11. The viscosity of the coating solution 11 should preferably be kept at 20 mPa•s or less in the case of an inkjet method, and is kept at about 12 mPa•s by heating the solution to about 60 degrees in the case of a liquid crystal. The nozzle diameter can, for example, be set to about 27 to 28 μm.

Manufacturing the liquid crystal display apparatus in accordance with the present embodiment involves, for example, forming a thermosetting dam 50 with a dispenser or the like on the first substrate 1 provided with a liquid crystal display element 106. In the process, spacing particles may be added to the dam 50 in order to maintain a uniform gap between the substrates. The dam 50 is then cured by keeping the substrates in a baking furnace for 10 minutes at 210° C.

The thin film forming apparatus 10 is then used to apply the liquid crystal to within the liquid crystal area inside the dam 50. In the process, spacing particles 111 can be added to the liquid crystal in order to maintain a uniform gap between the substrates 1 and 4. In this case, the liquid crystal 3 are preferably applied in an amount such that the top end face of the liquid crystal layer following application and the top end face of the dam 50 have substantially the same height.

The seal 2 is subsequently formed with a dispenser or the like outside the dam 50. In the process, spacing particles can be added to the seal 2 in order to maintain a uniform gap between the substrates 1 and 4.

The seal 2 is formed adjacent to the dam 50 to allow bonding with the dam 50, as shown in FIG. 3. This makes it possible to ensure a sufficient surface area for the liquid crystal display on the substrates 1 and 4.

In addition, the seal 2 is preferably formed so as to be thicker than the cured dam 50. Thus, the sealing properties are thereby improved.

The second substrate 4 provided with the oppositely disposed second liquid crystal display element 107 is subsequently positioned for lamination, and the two substrates are pressed and laminated in a vacuum, kept in an electric furnace at 120° C. for 10 minutes, and bonded together, yielding an electrooptical apparatus.

The present embodiment was described with reference to a coating solution 11 as the liquid crystal, but the present invention is not limited by the liquid crystal and may be applied, for example, to cases involving the use of ink materials (positive hole materials, luminescent materials) for organic EL applications.

Two specific examples of electronic devices in which the liquid crystal display panel pertaining to the present invention can be used will now be briefly described with reference to FIGS. 8 and 9.

The liquid crystal display panel pertaining to another embodiment of the present invention will first be described as an example of application to the display unit of a portable personal computer (so-called notebook computer). FIG. 8 is a perspective view depicting the structure of the personal computer. As shown in the drawing, the personal computer 91 comprises a main body 912 provided with a keyboard 911, and a display unit 913 obtained using the liquid crystal display panel pertaining to the present invention.

The liquid crystal display panel pertaining to still another embodiment of the present invention will now be described with reference to an example of application to the display unit of a portable telephone. FIG. 9 is a perspective view depicting the structure of the portable telephone. As shown in the drawing, the portable telephone 92 comprises an earpiece 922 and a microphone 923 in addition to a plurality of control buttons 921, as well as a display unit 924 obtained by applying the liquid crystal display panel pertaining to the present invention.

Figure 8:
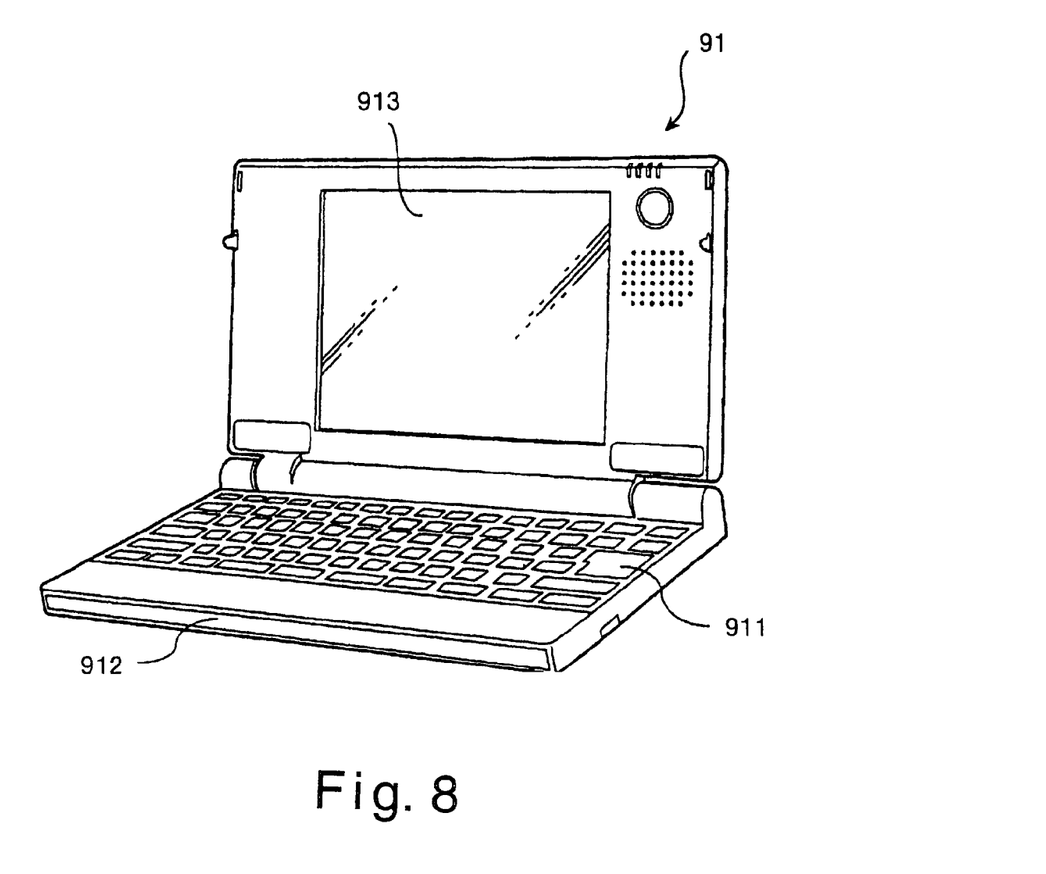
FIG. 8 is a perspective view of a personal computer with a liquid crystal panel manufactured in accordance with another embodiment of the present invention.
Figure 9:
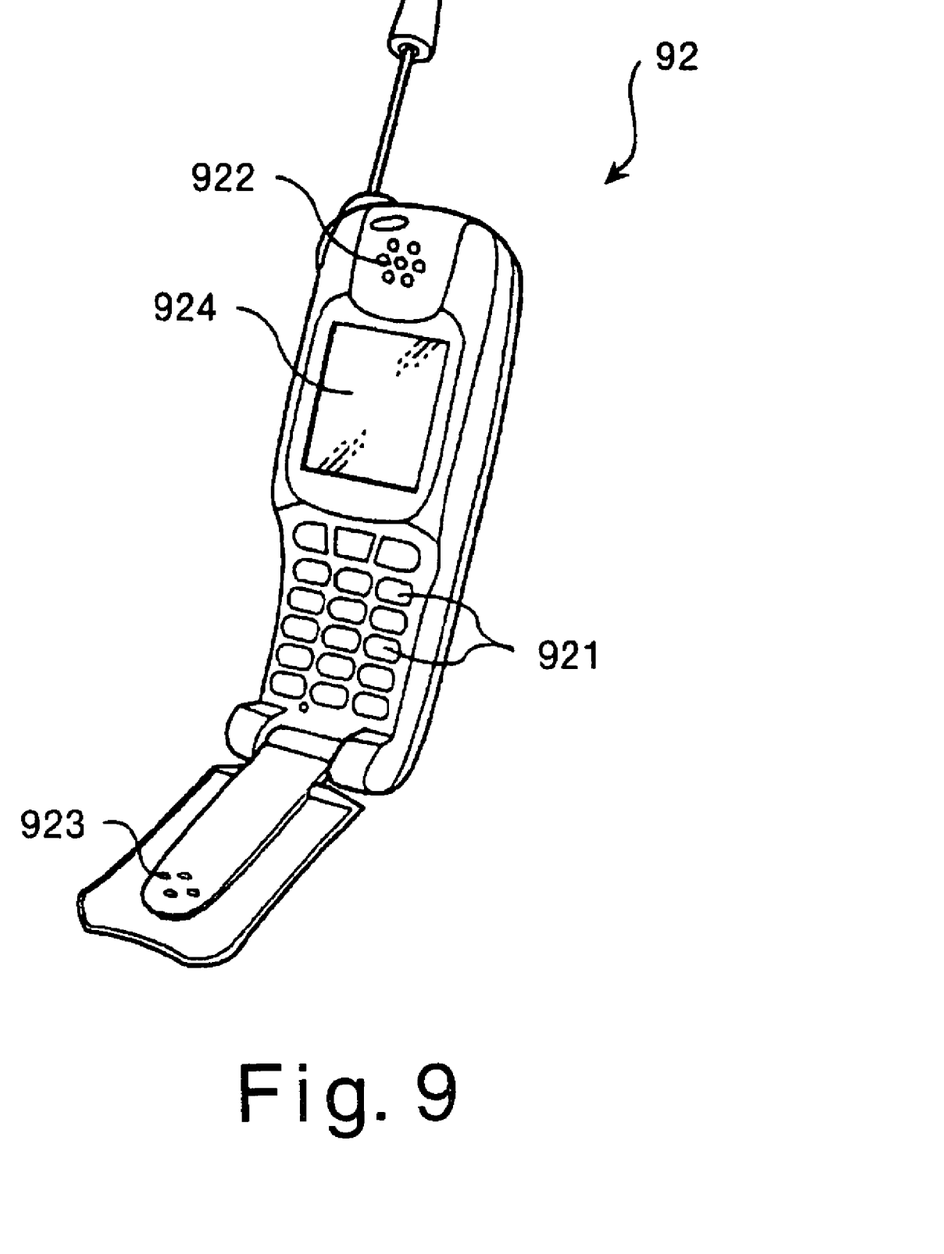
FIG. 9 is a perspective view of a portable phone with a liquid crystal panel manufactured in accordance with still another embodiment of the present invention.

Liquid crystal television sets, viewfinder-type/direct-view video cameras, car navigation systems, pagers, electronic notebooks, electronic calculators, word processors, workstations, camera phones, POS terminals, digital still cameras, and other applications can be cited in addition to the personal computer shown in FIG. 8 and the portable phone shown in FIG. 9 as examples of electronic devices obtained using the liquid crystal display panel pertaining to the present invention, and no specific limitations are imposed on such applications.

Also, cases involving a liquid crystal apparatus as the electrooptical apparatus were described with reference to the above embodiments, but the present invention is not limited to these cases alone and may also include electroluminescent devices such as, in particular, organic electroluminescent devices and inorganic electroluminescent devices, as well as plasma display devices, FED (field-emission display) devices, LED (light-emitting diode) display devices, electrophoretic display devices, flat panel monitors, liquid crystal shutters, and other miniature television sets, and various electrooptical apparatuses featuring digital micromirror displays (DMDs) and other devices.

As used herein, the following directional terms "forward, rearward, above, downward, vertical, horizontal, below and transverse" as well as any other similar directional terms refer to those directions relative to a device or an apparatus constructed in accordance with the present invention. Accordingly, these terms, as utilized to describe the present invention should be interpreted relative to a device or an apparatus constructed in accordance with the present invention.

Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-065319. The entire disclosure of Japanese Patent Application No. 2003-065319 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An electrooptical manufacturing apparatus for manufacturing an electrooptical apparatus, comprising:
   a dam-forming section being configured and arranged to form a dam that defines a liquid crystal area on a first internal surface of a first substrate, the dam including fluororesin to be liquid-repellent in order to realize low-wettability of the dam;
   a seal-forming section being configured and arranged to form a seal disposed around an external periphery of the dam to seal a second substrate that is disposed opposite to the first substrate, the seal-forming section being separately configured from the dam-forming section to form the seal to be independent of the dam, the dam being configured to separate the liquid crystal from the seal to prevent any contact between the liquid crystal and the seal;
   a droplet-ejecting section being configured and arranged to drop a specific amount of liquid crystal inside the dam, the droplet-ejecting section being a piezo-jet type;
   a heating unit being configured to heat the droplet-ejecting section in order to raise temperature and maintain desired fluidity of the liquid crystal; and
   a pressure applying section being configured and arranged to press the second substrate onto the seal formed on the first substrate.

2. The electrooptical manufacturing apparatus according to claim 1, wherein
   the seal-forming section is further configured and arranged to form the seal such that the seal extends higher than the dam from the first substrate prior to laminating the second substrate onto the first substrate.

3. The electrooptical manufacturing apparatus according to claim 1, wherein
   the dam-forming section and the seal-forming section are further configured and arranged to form the dam and the seal adjacent to each other.

4. The electrooptical manufacturing apparatus according to claim 1, wherein
   the dam-forming section and the seal-forming section are further configured and arranged to form the dam and the seal from the same material.

5. The electrooptical manufacturing apparatus according to claim 1, wherein
   the seal-forming section is further configured and arranged to form the seal with spacing particles.

6. The electrooptical manufacturing apparatus according to claim 1, wherein the droplet-ejecting section is further configured and arranged to disperse spacing particles on the first substrate.

7. The electrooptical manufacturing apparatus according to claim 6, wherein the spacing particles are dispersed in a coating solution with the liquid crystal.

8. The electrooptical manufacturing apparatus according to claim 1, wherein
the seal is a thermosetting or photo-setting adhesive.

* * * * *